United States Patent [19]

Mayer et al.

[11] Patent Number: 5,189,597
[45] Date of Patent: Feb. 23, 1993

[54] ELECTRIC CONTROL BOX, IN PARTICULAR FOR LOW-VOLTAGE SYSTEMS

[75] Inventors: Hartwig Mayer, Neckargerach; Manfred Hofmann, Eberbach; Hans-Peter Riedinger, Waldbrunn, all of Fed. Rep. of Germany

[73] Assignee: Abb Ceag Licht- und Stromversorgungstechnik GmbH, Soest, Fed. Rep. of Germany

[21] Appl. No.: 788,188

[22] Filed: Nov. 5, 1991

[30] Foreign Application Priority Data

Nov. 5, 1990 [DE] Fed. Rep. of Germany ....... 4035081

[51] Int. Cl.⁵ ............................................. H05K 5/02
[52] U.S. Cl. .................... 361/391; 312/323; 361/338; 361/340
[58] Field of Search ................. 312/223, 323; 211/41; 439/246–248, 341, 350, 352, 357, 358, 359, 362, 363, 367, 372; 361/331, 332, 356, 357, 338, 339, 340, 380, 390, 391, 417, 419, 420, 429

[56] References Cited

U.S. PATENT DOCUMENTS

| 3,146,048 | 8/1964 | Graham | 312/323 |
|---|---|---|---|
| 4,131,934 | 12/1978 | Becker | 361/428 |
| 4,258,967 | 3/1981 | Boudreau | 312/323 |
| 4,931,978 | 6/1990 | Drake | 364/708 |
| 4,972,296 | 11/1990 | Chu | 361/391 |

FOREIGN PATENT DOCUMENTS

| 1183157 | 12/1964 | Fed. Rep. of Germany . | |
|---|---|---|---|
| 1291398 | 3/1969 | Fed. Rep. of Germany . | |
| 338508 | 7/1959 | Switzerland . | |
| 721933 | 3/1980 | U.S.S.R. | 361/391 |
| 663895 | 12/1951 | United Kingdom | 361/391 |
| 2072954 | 10/1981 | United Kingdom | 361/391 |

*Primary Examiner*—Gerald P. Tolin
*Attorney, Agent, or Firm*—Herbert L. Lerner; Laurence A. Greenberg

[57] ABSTRACT

An electrical control box, particularly for low-voltage systems, includes an interior defining a compartment. At least one stationary counterpart contact and a counterpart element are disposed in the compartment. At least one drawer preferably being elongated rectangularly in the vertical direction is to be inserted into the compartment for holding electrical and/or electronic components for switching, controlling and the like. The at least one drawer has a back to be located in the interior and a bottom. Rollers are disposed on the bottom. At least one contact location is disposed on the back for respectively contacting the at least one stationary counterpart contact. A suspension joint disposed on the bottom is to be suspended at the counterpart element when installed, for permitting the at least one drawer to be swiveled between a first suspension position in which the at least one drawer is hinged obliquely forward and a second insertion position after the suspension position and to be moved between the second insertion position and an inserted position, and back again.

12 Claims, 6 Drawing Sheets

ELECTRIC CONTROL BOX, IN PARTICULAR FOR LOW-VOLTAGE SYSTEMS

The invention relates to an electric control box, particularly for low-voltage systems, having at least one drawer being insertable into a compartment of the control box, having rollers on its bottom, and preferably being elongatedly rectangular in the vertical direction, for holding electrical and/or electronic components for switching, controlling and the like, and the back of the drawer in the interior of the control box having at least one contact location each being contactable with a respective stationary counterpart contact in the control box.

Such a low-voltage control box has one or more drawers, which are accommodated side by side and/or in stacked fashion in a known configuration in drawer compartments inside a cabinet. The drawers have rollers that are movable on rails in the control box, and the rails are either rigid, or telescope into one another.

All of the drawers are square or more or less rectangular, and when they are installed they must be lifted by hand to the level of the drawer compartment, which requires a relatively large expenditure of physical strength, and then they must be inserted into the rails. With relatively small drawers containing not much equipment or only lightweight equipment such a procedure is relatively simple, but drawers of the kind known for power supply systems for telecommunications equipment are heavy, so that inserting the drawer into its compartment is difficult. Inserting drawers that are approximately equivalent in height to the control box is especially difficult.

German Published, Prosecuted Application DE-AS 11 83 157 discloses a control box in which the drawers, which are low in the vertical direction, are suspended in a rigid rail with a detent bolt and can be swiveled from a vertically downwardly suspended position to the horizontal position, so that they can be pushed into the compartment. However, such drawers cannot be compared with drawers that are elongatedly rectangular in the vertical direction.

German Published, Prosecuted Application DE-AS 12 91 398 discloses a low-voltage system that has sidewalls, on which rails that have an outwardly swivelable segment are disposed. The outwardly swivelable segment is intended as an aid in pushing a switch inward.

Swiss Patent No. 338 508 shows a similar version.

It is accordingly an object of the invention to provide an electric control box, in particular for low-voltage systems, which overcomes the hereinafore-mentioned disadvantages of the heretofore-known devices of this general type and which can be inserted into its compartment easily and without expending a great deal of physical strength.

With the foregoing and other objects in view there is provided, in accordance with the invention, an electrical control box, preferably for low-voltage systems, comprising an interior defining a compartment, at least one stationary counterpart contact and a counterpart element disposed in the compartment; at least one drawer preferably being elongated rectangularly in the vertical direction to be inserted into the compartment for holding electrical and/or electronic components for switching, controlling and the like, the at least one drawer having a back or back wall to be located in the interior and a bottom, rollers disposed on the bottom, at least one contact location disposed on the back for respectively contacting the at least one stationary counterpart contact, and a suspension joint disposed on the bottom to be suspended at the counterpart element when installed, for permitting the at least one drawer to be swiveled between a first suspension position in which the at least one drawer is hinged obliquely forward and a second insertion position after the suspension position and to be moved between the second insertion position and an inserted position, and back again.

According to the invention, the drawer, which has an elongatedly rectangular contour in the vertical direction, is hung from the suspension joint in a position that extends obliquely relative to the horizontal, it is swiveled into the vertical position, and it is moved to the inserted position.

Since the suspension joint is only a short distance from the bottom, the drawer can be hung with only the use of a little physical strength. After the suspension joint has been hung, only the vertically extending weight component of the drawer, that is inclined obliquely forward, or its weight moment then needs to be lifted. At a position of 45° from the horizontal, the physical strength that still must be expended to move the drawer to the vertical position is relatively slight.

In accordance with another feature of the invention, the at least one drawer is suspended in a suspension process and inserted over a given suspension length in an insertion direction, the counterpart element is at least one protrusion, the bottom of the at least one drawer has a wall portion, the suspension joint includes at least one oblong slot formed in the wall portion for receiving the at least one protrusion during the suspension process, and the at least one oblong slot has a length in the insertion direction corresponding to the insertion length.

In accordance with a further feature of the invention, the wall portion has edges defining the at least one oblong slot, and including a roller disposed on the at least one protrusion for rolling on one of the edges of the wall portion.

In accordance with an added feature of the invention, the wall portion includes lateral drawer surfaces having bottom regions, the at least one oblong slot is in the form of two oblong slots each being formed in a respective one of the bottom regions of the lateral drawer surfaces, and including opposed lateral compartment surfaces at least partially defining the compartment, the at least one protrusion being in the form of two protrusions each being disposed on a respective one of the opposed lateral compartment surfaces, and the lateral drawer surfaces having openings formed therein for opening the oblong slots toward the bottom regions and permitting the protrusions to pass through the openings into the oblong slots when the at least one drawer is hung.

In accordance with an additional feature of the invention, the at least one drawer has a front, the oblong slots have ends facing toward the front and ends facing away from the front of the at least one drawer, and the lateral drawer surfaces have pockets formed therein at the ends of the oblong slots facing away from the front of the at least one drawer defining hooks each fitting partly around a respective one of the protrusions in the first suspension position.

In other words, when the drawer is being hung, the two oblong slots are pushed over the protrusions, so that these protrusions catch behind the hooks formed on the oblong slots and in the suspended state, these hooks fit part way around the associated protrusion.

In order to provide for better assembly, in accordance with yet another feature of the invention, there is provided a frame secured on the bottom of the at least one drawer, on which the suspension joint, such as the oblong slots and optionally rollers are well, are mounted.

In accordance with yet a further feature of the invention, the drawer has a rectangularly elongated contour in the vertical direction, and the height of each drawer is a distinct multiple of its width and/or is equivalent to the height of the control box.

In accordance with yet an added feature of the invention, the at least one drawer has a front, and there are provided two handles being mutually spaced apart on the back of each of the at least one drawer, for manually transporting the at least one drawer in a horizontal position with the front pointing downward and suspending the drawer from the control box. Due to the elongated contour, the suspension means is always relatively low above the floor on which the control box stands, so that the drawer does not have to be raised to a height above the head, as is true in the extreme case in known types of drawers.

In accordance with yet an additional feature of the invention, the at least one drawer is inserted in a given insertion direction, and including a screw bolt or spindle extending in the given insertion direction, penetrating the at least one drawer and being undisplaceable relative to the at least one drawer, the spindle having a portion protruding from the back of the at least one drawer with an external thread, the compartment having a back wall with an internal thread into which the external thread of the spindle is to be screwed, and the external thread being screwed into the internal thread by turning the spindle for moving the at least one drawer into the insertion position.

The length of the internal thread and of the external thread on the spindle is equivalent to the length needed in order to close the contact points at the back wall of the drawer and at the opposing wall of the control box. The contacts are constructed as plug-and-socket contacts, and the contacts on the control box in particular are constructed as floating contacts, which are disposed in such a way as to be movable transversely to the contacting direction, in order to suit any tolerances that may arise. The spindle can be turned with a battery-operated screwdriver or optionally with a crank.

If the control box is intended to be used to hold power supply devices, particularly rectifiers, power packs, power converters and the like for telecommunications equipment, then the drawer contains capacitors, which are intended to charge during the insertion process in order to avoid damage to the electronic components.

Accordingly, each drawer compartment is provided with one contact element, which is described, for instance, in German Published Petty Patent Application DE-GM 87 17 645.9. These contact elements are two-stage contact elements. The counterpart contact element on the drawer first enters into electrical-galvanic contact with a first contact part. Since a resistor is provided between the two contact parts that is dimensioned for charging the capacitors located in the drawer, a corresponding charging current flows into the capacitors, first through this resistor and the so-called first contact element. It is only after the capacitors have charged that the second contact part of each contact element should come into electrical-galvanic contact with the counterpart contact on the drawer. The important factor is to adjust the speed of insertion to the charging time in such a way that the second contact part, with which the resistor in the contact element is practically bypassed, is not contacted by the counterpart contact in the drawer until the capacitors have become fully charged.

This can be done in a preferred manner by suitable dimensioning of the screw spindle. If the screw thread has a suitable pitch and a suitable length, then the contacting time at the contact elements, or the charging time, can be adhered to even if an electrical screwdriver is used. The rotary speed of the electrical screwdriver is accordingly adjusted to the pitch of the thread of the screw spindle, or the thread dimensions are adjusted to the rotary speed of the screwdriver, in such a way that the resistor in the contact element is not bypassed until the capacitors have charged.

Therefore, in accordance with a concomitant feature of the invention, there is provided a contact plug being disposed in the compartment, being divided into first and second contact parts and having a resistor connected between the contact parts, the at least one contact location having a contact socket in the at least one drawer to be engaged by the contact plug for passing a current through the resistor after the at least one contact location contacts the first contact part, for charging capacitors in power packs disposed in the at least one drawer to supply electronic systems, and the at least one contact location contacts the second contact part and bypasses the resistor only after charging the capacitors, the back wall of the compartment having another socket with the internal thread, the internal thread being dimensioned relative to the external thread of the spindle for setting a period of time between contacting of the first contact part and the second contact part by the at least one contact location when the spindle is turned by a commercially available electric screwdriver at a maximum rotary speed thereof, causing charging of the capacitors in the at least one drawer to end before the second contact part is contacted by the counterpart contact on the at least one drawer.

Other features which are considered as characteristic for the invention are set forth in the appended claims.

Although the invention is illustrated and described herein as embodied in an electric control box, in particular for low-voltage systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
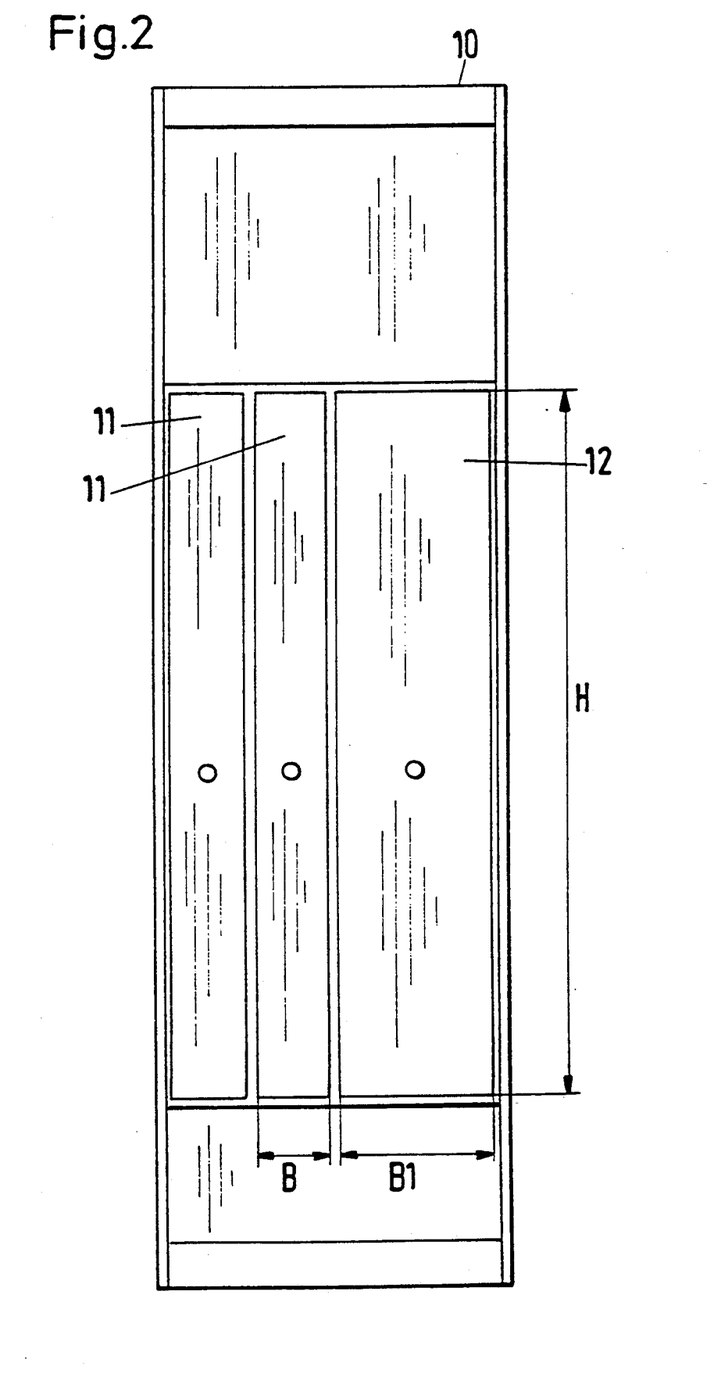
FIG. 2 is a front-elevational view of the control box with drawers inserted.

Referring now to the figures of the drawing in detail and first, particularly, to FIG. 2 thereof, there is seen a control or switch box 10 in which three drawers 11 and 12 are inserted. It can be seen from FIG. 2 that the height H is substantially greater than the width B of the drawers 11, so that the contour of the drawers 11 is markedly elongatedly rectangular. The width $B_1$ of the drawer 12 in this case is twice as great as the width B of the drawers 11. The drawer 12 also has a markedly elongatedly rectangular contour.

Figure 1:
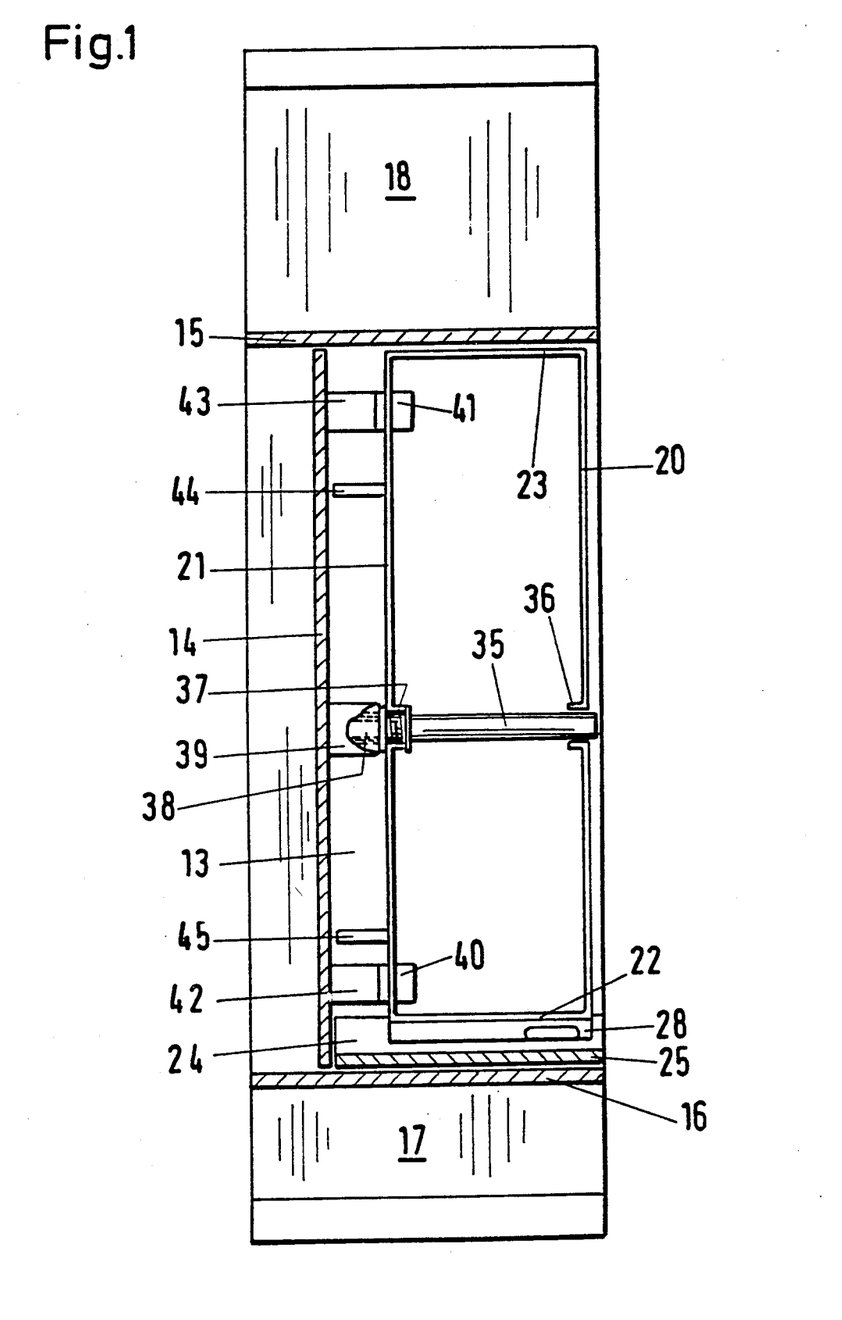
FIG. 1 is a diagrammatic, partly broken-away, cross-sectional view of a control box with a drawer inserted.

The drawers 11 and 12 are each inserted into a drawer compartment 13, which is closed off by a back wall 14, a top wall 15 and a bottom wall 16, as is seen in FIG. 1. Electrical or electronic switch and control elements are provided in a space or chamber 17 below the bottom or lower wall 16, while in contrast, supply or outlet lines are provided in a space or chamber 18 above the top or upper limiting wall 15. Optionally, supply lines, power lines and the like can be laid in the space 17.

Figure 3:
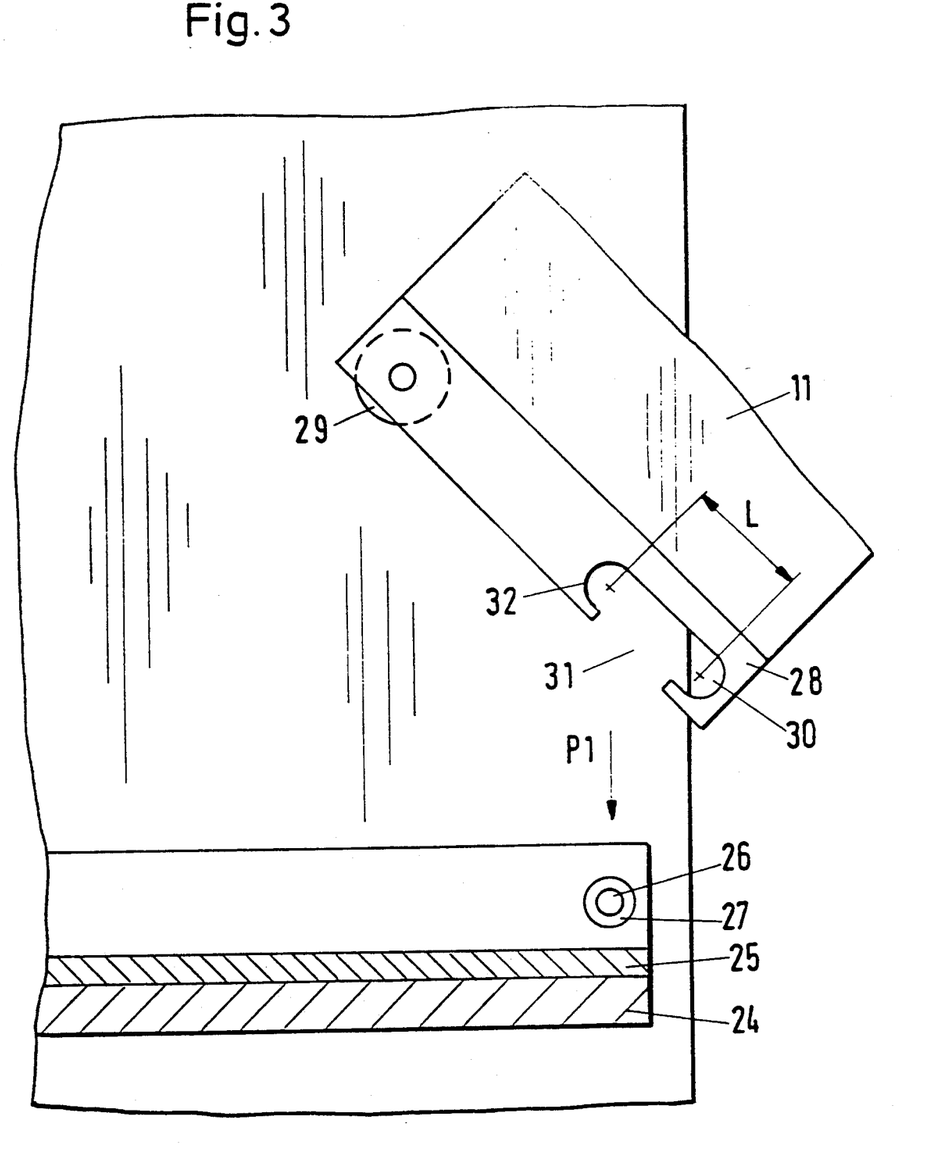
FIGS. 3, 4 and 5 are enlarged, fragmentary, partly sectional views, each showing different positions of the drawer with respect to the control box.
Figure 4:
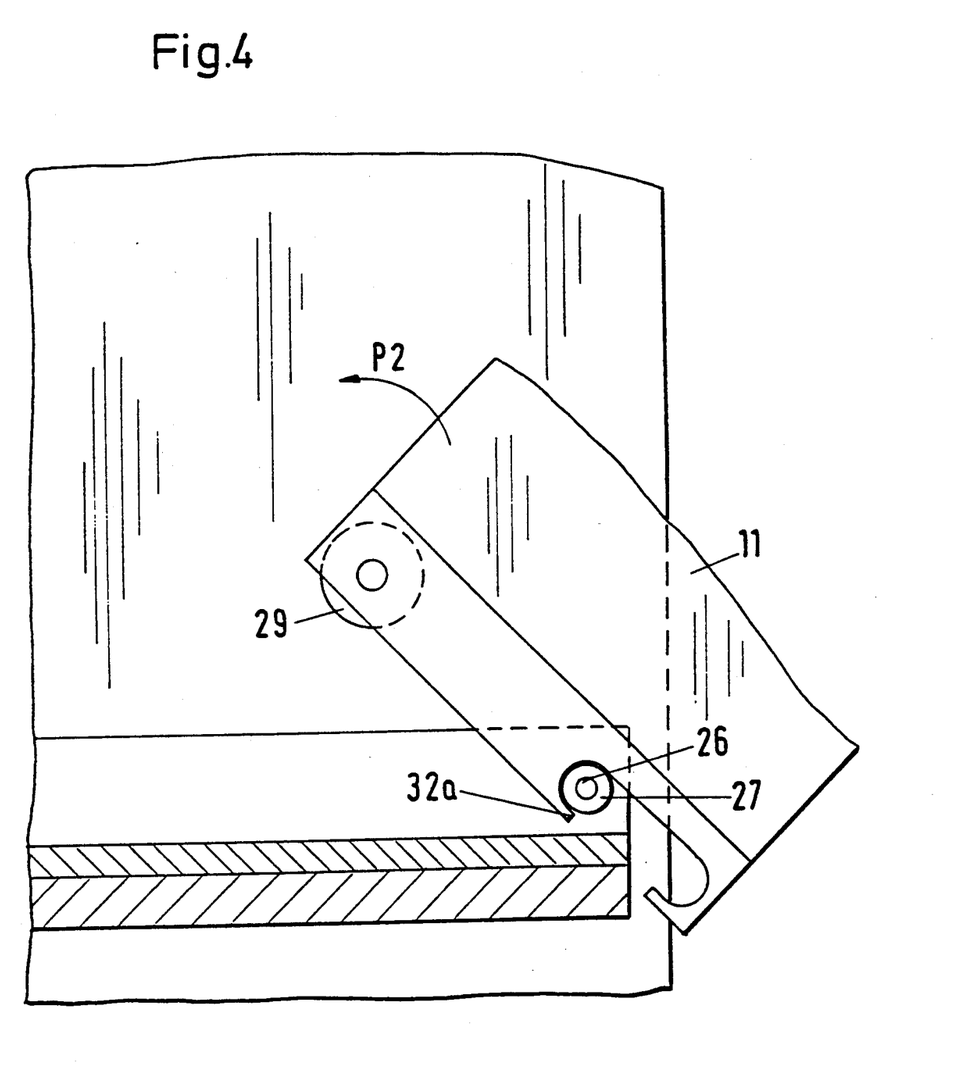
Figure 5:
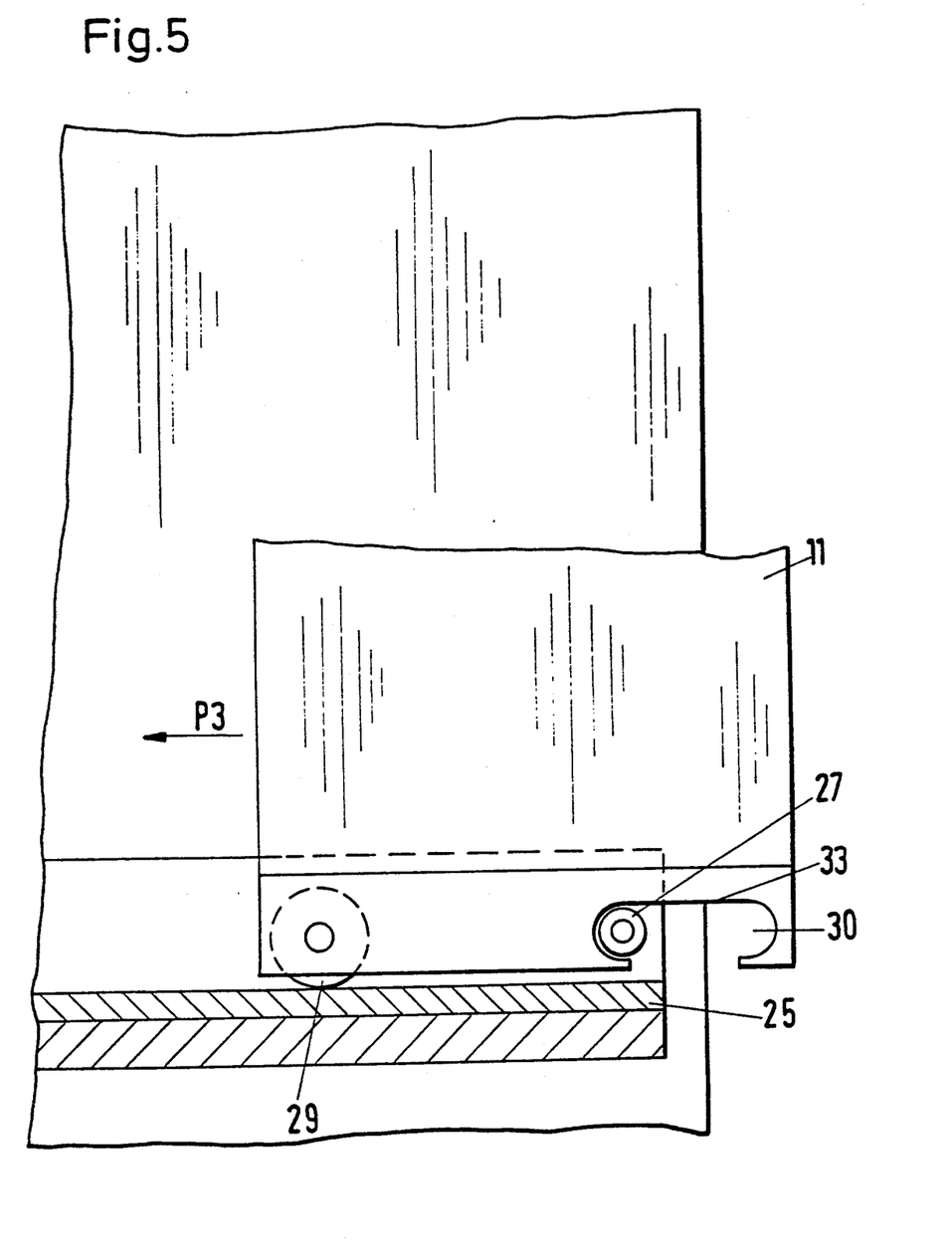

The drawer shown in FIG. 1 has a front wall 20, a back wall 21, non-illustrated side walls, and bottom and top walls 22 and 23. Two frame parts 24 are secured to the control box under the bottom wall 22 of each drawer, at a spacing for each compartment corresponding to the width of each drawer 11, 12. Horizontally extending rails 25 are disposed on opposed side walls of these frame parts 24. As is seen in FIGS. 3, 4 and 5, one protrusion 26, on which a roller 27 is supported, is also disposed in the vicinity of the front wall of the control box 10 on each frame part 24.

The lower end of the drawer itself has a frame 28. As is seen in FIGS. 3, 4 and 5, one end of the frame 28 has a roller 29 located inside the control box, and an opposite end which is intended to be located at the front, has an elongated recess or oblong slot 30 each being disposed in the vicinity of one of the two side walls of the drawer. The recesses are open at the bottom in the form of an opening 31.

The procedure for installing the drawer is as follows: First, the drawer is placed in an inclined position with respect to the horizontal, as is shown in FIG. 3, and it can be firmly held by means of handles 44 and 45 seen in FIG. 1. The drawer is then introduced into the compartment, in such a way that the opposed protrusions 26, with the rollers 27, forming a counterpart element, pass through the openings 31 into the oblong slot 30. After the drawer is lowered as is indicated by an arrow P1 in FIG. 3, the protrusions 26 with the rollers 27 engage a pocket 32 formed by the opening 31, so that in this position the drawer 11 can be supported on the protrusions 26 and rollers 27. The pockets define hooks 32a each fitting partly around one of the protrusions 26 in the suspension position. In other words, in the vicinity of its horizontally extending front edge, the drawer is supported on or in other words suspended from a protrusion 26 and roller 27. The drawer 11 is then swiveled about the protrusion 26 and roller 27 as is indicated by an arrow P2 in FIG. 4, so that it reaches the position shown in FIG. 5, in which the rollers 29 rest on the rail 25. Upper edges 33 of the oblong slots 30 rest on the protrusions 26 and the rollers 27, so that the weight of the drawer is supported on the rollers 29 and 27. In this position, the drawer 11 can be pushed into the interior of the drawer compartment in the direction of an arrow P3. Therefore, the drawer 11, 12 can be swiveled from a first or suspension position in which it is hinged obliquely forward, into a second or insertion position after the suspension, in which second position the drawer 11, 12 can be moved into its inserted position and vice versa. Therefore, elements 30 and 31 form a suspension joint disposed on the bottom of the drawer to be suspended at the counterpart element 26, 27 when installed, for permitting the drawer 11, 12 to be swiveled between a first suspension position in which the drawer 11, 12 is hinged obliquely forward and a second insertion position.

For purposes of simplification, this is done as follows: As is seen in FIG. 1, the drawer 11 is penetrated by a spindle 35 which is supported in the drawer. The spindle 35 is supported in indentations 36 on the front wall 20 and indentations 37 on the rear wall 21 and is guided in such a way that it cannot be displaced horizontally. The part of the spindle 35 protruding from the back wall 21 of the drawer is provided with an external thread 38 providing a contact location, which can be screwed into an internal thread that is disposed in a socket or counterpart contact 39 on the back wall 14. Screwing the thread or contact location 38 into the internal thread of the socket or counterpart contact 39 moves the drawer backward in the direction of the arrow P3 in FIG. 5.

During this insertion process, contact sockets 40 and 41 located on the drawer come into contact with floating contact plugs 42 and 43 supported on the back wall 14. "Floating" means that the contact plugs 42 and 43 are displaceable transversely to the contacting direction, so that tolerances can thereby be compensated for and correct contact-making at contact locations between the elements 40/42 and 41/43 can always be assured.

The thread length or insertion depth of the thread or contact location 38 into the thread of the socket or counterpart contact 39 is equivalent to the length L of the oblong slot 30 seen in FIG. 3 and to the insertion length of the contact pins into the contact sockets.

Figure 6:
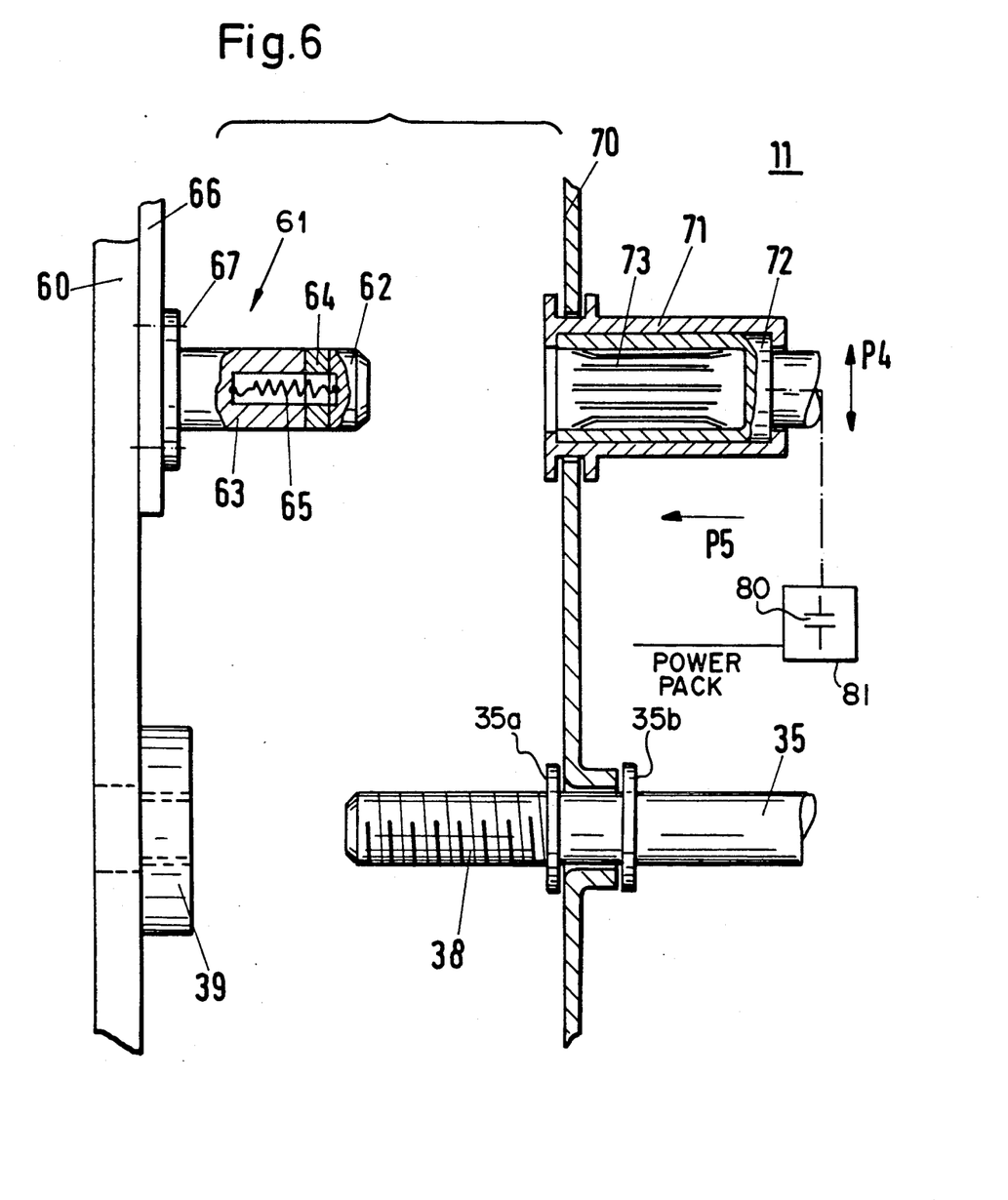
FIG. 6 is a fragmentary, partly sectional and partly broken-away, exploded view of a control box with a drawer having contact elements as disclosed in German Published Petty Patent Application DE-GM 87 17 645.9.

Contact elements or plugs 61, which form counterpart contacts, correspond to the contact elements described in German Published Petty Patent Application DE-GM 87 17 645.9, are mounted on a back wall 60 of a drawer compartment. Each contact element has a first contact part 62, which is electrically insulated by an insulating layer 64 from a second contact part 63, that may be constructed as a socket. A resistor 65 is located between the first contact part 62 and the second contact part 63 and is connected by its two ends to the respective contact parts 62 and 63. The second contact part 63 is electrically-galvanically connected to an electrical connection line 66 by means of a suitable screw connection 67. As is described in German Published Petty Patent Application DE-GM 87 17 645.9, the second contact part 63 could also have a threaded blind bore, so that it could be secured on the conductor or connection line 66 by means of a screw.

A counterpart contact or contact location 71 is floatingly supported on the back wall 70 of a compartment in the drawer 11, so that this part can execute motions in the direction of an arrow P4 or at right angles to the plane of the drawing. The counterpart contact or contact location 71 has a contact socket 72 in which a multiple contact 73 is optionally accommodated, as is shown in the drawing.

When the drawer is pushed in the direction of an arrow P5, the first contact part 62 first comes into electrical-galvanic contact with the multiple contact or contact laminations 73 of the counterpart contact or contact location 71, causing current to flow through the resistor 65, by means of which current capacitors 80 located in the drawer can be charged, as is described in German Published Petty Patent Application DE-GM 87 17 645.9. Once these capacitors 80 of power packs 81 have been charged for supplying electronic systems, the counterpart contact or contact location 71 comes into contact with the second contact part 63, so that a main contact is closed.

The contact locations provided by the elements 38, 71 disposed on said back 14, 70 of the drawer respectively contact stationary counterpart contacts provided by the elements 39, 62. The external thread or contact location 38 of the spindle 35 is dimensioned in such a way that when a battery-powered screwdriver is used, the counterpart contact or contact location 71 remains in contact with the first contact part 62, and only with it, until the capacitors, which are not shown in FIG. 6 of the drawing, have been charged. It is only afterwards that the second contact part 63 should come into contact with the counterpart contact or contact location 71. If actuation of the screw spindle 35 is to be performed with a crank, then the thread may optionally have some different configuration instead. The resistance of the resistor 65 and the length and pitch of the thread of the screw spindle 35 and therefore of the internal thread of the socket or counterpart contact 39 seen in FIG. 6 as well, must be adapted in such a way that even at maximum rotary speed of the installation tool intended, whether a crank or a battery-powered screwdriver, or both, the charging time of the capacitors is assured.

In order to avoid axial shifting in the drawer, the spindle 35 has two protrusions 35a, 35b, between which the wall 70 is located.

We claim:

1. An electrical control box, comprising an interior defining a compartment with a front region, at least one stationary counterpart contact disposed in said compartment and a counterpart element disposed in said front region of said compartment; at least one drawer removably inserted into said compartment and having electrical and electronic component means for switching and controlling, said at least one drawer having a rectangularly elongated contour, with a height being a multiple of a width of each of said at least one drawer, said at least one drawer having a back located in said interior in an inserted position and a bottom, rollers disposed on said bottom, at least one contact disposed on said back for respectively contacting said at least one stationary counterpart contact, said at least one drawer having a front, and including two handle means being mutually spaced apart on said back of each of said at least one drawer, for manually transporting said at least one drawer in a horizontal position with said front pointing downward, and a swivel suspension joint disposed on said bottom to be suspended at said counterpart element when installed, for permitting said at least one drawer to be swiveled between a first suspension position in which said at least one drawer is hinged obliquely forward with said front pointing downward and a second insertion position after the suspension position and to be moved between the second insertion position and an inserted position.

2. The control box according to claim 1, wherein said at least one drawer is suspended in a suspension process and inserted over a given suspension length in an insertion direction, said counterpart element is at least one protrusion, said bottom of said at least one drawer has a wall portion, said suspension joint includes at least one oblong slot formed in said wall portion for receiving said at least one protrusion during the suspension process, and said at least one oblong slot has a length in the insertion direction corresponding to said insertion length.

3. The control box according to claim 2, wherein said wall portion has edges defining said at least one oblong slot, and including a roller disposed on said at least one protrusion for rolling on one of said edges of said wall portion.

4. The control box according to claim 2, wherein said wall portion includes lateral drawer surfaces having bottom regions, said at least one oblong slot is in the form of two oblong slots each being formed in a respective one of said bottom regions of said lateral drawer surfaces, and including opposed lateral compartment surfaces at least partially defining said compartment, said at least one protrusion being in the form of two protrusions each being disposed on a respective one of said opposed lateral compartment surfaces, and said lateral drawer surfaces having openings formed therein for opening said oblong slots toward said bottom regions and permitting said protrusions to pass through said openings into said oblong slots when said at least one drawer is hung.

5. The control box according to claim 4, wherein said oblong slots have ends facing toward the front and ends facing away from the front of said at least one drawer, and said lateral drawer surfaces have pockets formed therein at said ends of said oblong slots facing away from the front of said at least one drawer defining hooks each fitting partly around a respective one of said protrusions in the first suspension position.

6. The control box according to claim 1, including a frame secured on said bottom of said at least one drawer, on which said suspension joint is mounted.

7. The control box according to claim 1, wherein the height of said at least one drawer is approximately equivalent to the height of the control box.

8. The control box according to claim 1, wherein said at least one drawer is inserted in a given insertion direction, and including a spindle extending in said given insertion direction, penetrating said at least one drawer and being undisplaceable relative to said at least one drawer, said spindle having a portion protruding from said back of said at least one drawer with an external thread, said compartment having a back wall with an internal thread into which said external thread of said spindle is to be screwed, and said external thread being screwed into said internal thread by turning said spindle for moving said at least one drawer into the insertion position.

9. The control box according to claim 8, including a contact plug being disposed in said compartment, being divided into first and second contact parts and having a resistor connected between said contact parts, said at least one contact location having a contact socket in said at least one drawer to be engaged by said contact plug for passing a current through said resistor after said at least one contact location contacts said first contact part, for charging capacitors in power packs disposed in said at least one drawer to supply electronic systems, and said at least one contact location contacts said second contact part and bypasses said resistor only after charging the capacitors, said back wall of said compartment having another socket with said internal thread, said internal thread being dimensioned relative to said external thread of said spindle for setting a period of time between contacting of said first contact part and said second contact part by said at least one contact location when said spindle is turned by a commercially available electric screwdriver at a maximum rotary speed thereof, causing charging of the capacitors in said at least one drawer to end before said second contact part is contacted by said counterpart contact on said at least one drawer.

10. An electrical control box, comprising a compartment having front and back regions, a stationary counterpart contact disposed in said back region and a counterpart element disposed in said front region of said compartment; a drawer removably inserted into said compartment, said drawer having a back located in said compartment in an inserted position and a bottom, rollers disposed on said bottom, a contact disposed on said back for contacting said stationary counterpart contact, and swivel suspension means disposed on said bottom for suspending said drawer at said counterpart element and for swiveling and sliding said drawer into and out of said compartment.

11. In combination,
   a housing of an electrical control box, comprising a compartment removably receiving a drawer with electrical and electronic component means, a stationary counterpart contact and a counterpart element disposed in said compartment; and
   the drawer removably inserted into said compartment of said housing, said drawer comprising a back to be located in said compartment and a bottom, roller means disposed on said bottom for rolling said drawer in said compartment, a contact disposed on said drawer for contacting said stationary counterpart contact in said compartment, and swivel suspension means disposed on said bottom for suspending said drawer at said counterpart element and for swiveling and sliding said drawer into and out of said compartment.

12. The control box according to claim 11, including two handle means being mutually spaced apart on said drawer, for manually transporting said drawer in a substantially horizontal position with said front pointing downward.

* * * * *